US005487321A

United States Patent [19]
Kimura et al.

[11] Patent Number: 5,487,321
[45] Date of Patent: Jan. 30, 1996

[54] KEYBOARD LID, ITS OPEN-CLOSE STRUCTURE AND ARM MEMBERS FOR KEYED INSTRUMENT

[75] Inventors: Masaji Kimura; Yoshiaki Shimoda, both of Hamamatsu, Japan

[73] Assignee: Kabushiki Kaisha Kawai Gakki Seisakusho, Shizuoka, Japan

[21] Appl. No.: 352,566

[22] Filed: Dec. 9, 1994

Related U.S. Application Data

[63] Continuation of Ser. No. 17,256, Feb. 12, 1993, Pat. No. 5,429,026.

[30] Foreign Application Priority Data

| | | | |
|---|---|---|---|
| Mar. 9, 1992 | [JP] | Japan | 4-021235 U |
| Mar. 9, 1992 | [JP] | Japan | 4-021236 U |
| Mar. 9, 1992 | [JP] | Japan | 4-021237 U |

[51] Int. Cl.[6] .............................. G01C 3/12; G01C 3/02; A47B 51/00

[52] U.S. Cl. .......................... 84/423 R; 84/179; 312/312

[58] Field of Search ................................ 84/423 R, 178, 84/179, DIG. 17; 312/312

[56] References Cited

U.S. PATENT DOCUMENTS

| | | | |
|---|---|---|---|
| 602,808 | 4/1898 | Kracht | 84/179 |
| 2,113,045 | 4/1938 | Evans | 84/179 |

*Primary Examiner*—Cassandra C. Spyrou
*Attorney, Agent, or Firm*—Evenson, McKeown, Edwards & Lenahan

[57] ABSTRACT

An apparatus for slidingly opening and closing a keyboard lid for covering a keyboard of a keyed instrument between an open position and a close is provided. The keyboard lid has a front end with a pair of opposite sides and a rear end with a pair of opposite sides. A pair of front guide projections project laterally from the opposite sides of the front end of the keyboard lid. A pair of rear guide projections project laterally from the opposite sides of the rear end of the keyboard lid. A pair of side plates are arranged on opposite sides of the keyboard. Each one of the pair of side plates has a front guide groove engaging with a respective one of the pair of front guide projections and a rear guide groove engaging with a respective one of the pair of rear guide projections. In this manner, the keyboard lid is slidably guided between an open position and a close position.

2 Claims, 8 Drawing Sheets

KEYBOARD LID, ITS OPEN-CLOSE STRUCTURE AND ARM MEMBERS FOR KEYED INSTRUMENT

This is a continuation of application Ser. No. 08/017,256, filed Feb. 12, 1993 now U.S. Pat. No. 5,429,026.

BACKGROUND OF THE INVENTION

1. Field of the Invention

The present invention relates to a keyboard lid (fallboard), its open-close structure and arm members for keyed instrument such as an electronic piano.

2. Description of Background Art

Heretofore it is known a keyboard lid for keyed instrument, for example, as disclosed in Japanese Laid-open Utility Model Publication No. 8390/91. This keyboard lid comprises a lid body and frame plates arranged at before and behind ends of the lid body to decorate and reinforce it. The frame plates are integrally constructed as having a substantially H-shaped cross-section and assembled to the lid body with the ends of the lid body inserted into the inside of the frame plates. The upper half of the frame plates exposed to the outside of the instrument body is adapted to function mainly as a decoration member and the lower half of the frame plates concealed within the instrument body is adapted to function mainly as a reinforcing member.

However since the frame plate of the prior art has an integrally formed structure, there is a limitation in selecting materials such that whole structure can satisfy both the decorative and reinforcing functions. That is, when a material superior in decorative function such as wood is selected the frame plate must be thickened for reinforcement and reduces the space efficiency especially in the back side of the frame plate. On the other hand, when a material superior in strength such as steel is selected the decorative function is reduced. If using, for example, an extruded aluminum member to satisfy both the functions, the cost for forming the frame plate is increased.

Japanese Laid-open Utility Model Publication No. 8390/91 also discloses an open-close structure of a slide lid which is one of open-close structures of a keyboard lid for keyed instrument. The slide lid is so constructed that it can slide between a close position in which the lid is pulled out proximally to cover the keyboard and an open position in which the lid is pushed distally into the instrument body to expose the keyboard. Arranged at opposite sides of the keyboard are inner plates of arm member which extend into the instrument body. Each inner plate is provided with, at a proximal external side thereof, a decoration plate for supporting the slide lid in the close position and decorating the keyboard, and at an distal inside thereof, a rack and a guide groove for carrying out smooth sliding of the slide lid. These decoration plate, rack and guide groove are formed integrally with each other. A pair of right and left pinions mating with the rack is mounted on the distal end of the slide lid and the opposite ends of the pinion shaft are adapted to be guided within the guide groove. On opening and closing of the lid by a player, he grasps the lid with his fingers hooking the handle portion of the front bottom end of the lid, and then lifts up and pushes distally the lid to open it or pulls the lid proximally to close it. The slide lid is adapted to be slid in and out the instrument body through a slit formed between a control panel arranged behind the keyboard and a top plate.

However, since the slide lid of the prior art can be freely opened and closed at the proximal end thereof, it is often erroneusly over-lifted and therefore the upper surface of the lid is liable to abut against the top plate of the instrument body and thus damages the top plate or the slide lid. This is apt to be caused due to a fact that the conventional keyboard lid adopts a structure to open the lid by pulling the lid up and then falling it down distally and a fact that the lid is naturally lifted up when it is pulled up with fingers hooking the handle portion of the lid. In addition, it is hard to smoothly slide the lid when the direction on which the lid is arranged is out of the direction of the guide groove.

Japanese Laid-open Utility Model Publication No. 8390/91 further discloses arm members for a keyed instrument. Each of the arm members has an outer plate of arm member forming an upper surface, external side surfaces and front and rear surfaces of the arm member, an inner plate forming an inside side surface thereof, and a decoration plate arranged close to a keyboard and decorating it. These plates are formed of the same material as each other such as plastics and the inner plate and the decoration plate are integrally formed with one another. The inner plate with the decoration plate is secured to the outer plate by screws via a plurality of bosses projected from the inside surface of the outer plate.

Such conventional arm member must be so designed that it stands against heavy load since the arm member is heavy in its own weight and it has to support weights of persons or articles when they are leaned against or placed on it. On the other hand, the arm member must be superior in decoration since it is a very important element for the decoration of a keyed instrument. That is, the arm member must have both the decorative and reinforcing functions. However since the arm member of the prior art is formed by outer and inner plates of the same material, the arm member is apt to be weakened in strength when its material is selected from those taken serious view of decorative function, on the contrary, the arm member is apt to become poor in decoration when its material is selected from those taken view of reinforcing function. Also if the arm member is formed by a material satisfying both the functions, the degree of freedom of selection of material is decreased and the manufacturing cost of them is increased. In addition, since the inner plate of arm member except for the decoration plate is concealed within the instrument body, when the arm member is formed by a material taken serious view of decorative function this portion will result in costly vain.

SUMMARY OF THE INVENTION

It is therefore an object of the present invention to provide a keyboard lid for keyed instrument of low cost and having both the decorative and reinforcing functions.

It is another object of the present invention to provide an open-close structure of a keyboard lid for a keyed instrument which can smoothly open and close the keyboard lid.

It is further object of the present invention to provide arm members for keyed instrument keeping low cost and having both the decorative and reinforcing functions.

In order to achieve the first object mentioned above there is provided, according to a first present invention, a keyboard lid comprising a lid body and a frame plate attached to the edge of the lid body for reinforcing it characterized in that said frame plate has a decoration plate arranged at the outside of said lid body and a reinforcing plate arranged at the inside of said lid body, and that said decoration plate and said reinforcing plate are formed separately with each other.

Since the frame plate is formed by a decoration plate arranged at the outside of the lid body and a reinforcing plate arranged at the inside thereof it is possible to allot these two plates for two functions required for the frame plate, respectively. That is, the decoration plate can be formed in any suitable configuration by a material superior in decorative function and the reinforcing plate can be formed in any suitable configuration by a material superior in strength. Accordingly the decoration plate and the reinforcing plate can be formed of materials selected from various kinds of materials and especially the reinforcing plate can be formed by a thin member.

In order to achieve the second object above, there is provided, according to a second present invention, an open-close structure of a keyboard lid for keyed instrument slidable between a close position covering the keyboard when moved along side plates arranged opposite sides of the keyboard and an open position when accomodated within a body of keyed instrument characterized in that said keyboard lid has guide projections at least at front opposite sides thereof, and that each of said side plates has a guide groove engaged with said guide projection for slidably guiding said keyboard lid between said open and close positions.

Since the open-close structure of a keyboard lid has guide grooves in the side plates arranged at opposite ends of the keyboard and guide projections at front opposite sides of the keyboard lid, the keyboard lid can be guided and slid within the guide grooves. Large amount of lifting up of the keyboard lid is prevented by the presence of the guide grooves. If trying to erroneously lift the lid up, the lid will be moved forward by a component of the lifting up force. This movement will make a person or player perceive that the lid has a sliding structure and thus make him adjust the magnitude and direction of the force to be applied to the lid.

In order to achieve the third object, there is provided, according to a third present invention, arm members of keyed instrument for forming opposite side plates of a keyed instrument body with sandwiching the keyboard therebetween characterized in that each of said arm members has an outer plate of arm member forming at least a portion of an upper surface and an outer side surface of said arm member, an inner plate of arm member forming an inner surface of said arm member, and a reinforcing plate arranged between said outer plate and inner plate and reinforcing these plates, and that said outer, inner and reinforcing plates of arm member are formed separately with each other.

It is possible to provide the outer and inner plates with the decorative function and also to provide the reinforcing plate with the reinforcing function and therefore to wholly provide the arm member with both the decorative and reinforcing functions by forming each of the arm member from the separate outer, inner and reinforcing plates. In this case, since there is no need to provide the inner and outer plates with the reinforcing function and also no need to provide the reinforcing plate with the decorative function, it is possible to select materials suitable for them from various kinds of materials. The portion of the inner plate of arm member concealed within the instrument body may be omitted.

DESCRIPTION OF THE PREFERRED EMBODIMENT

A preferred embodiment of the present invention will be hereinafter described with reference to the accompanying drawings.

Figure 1:
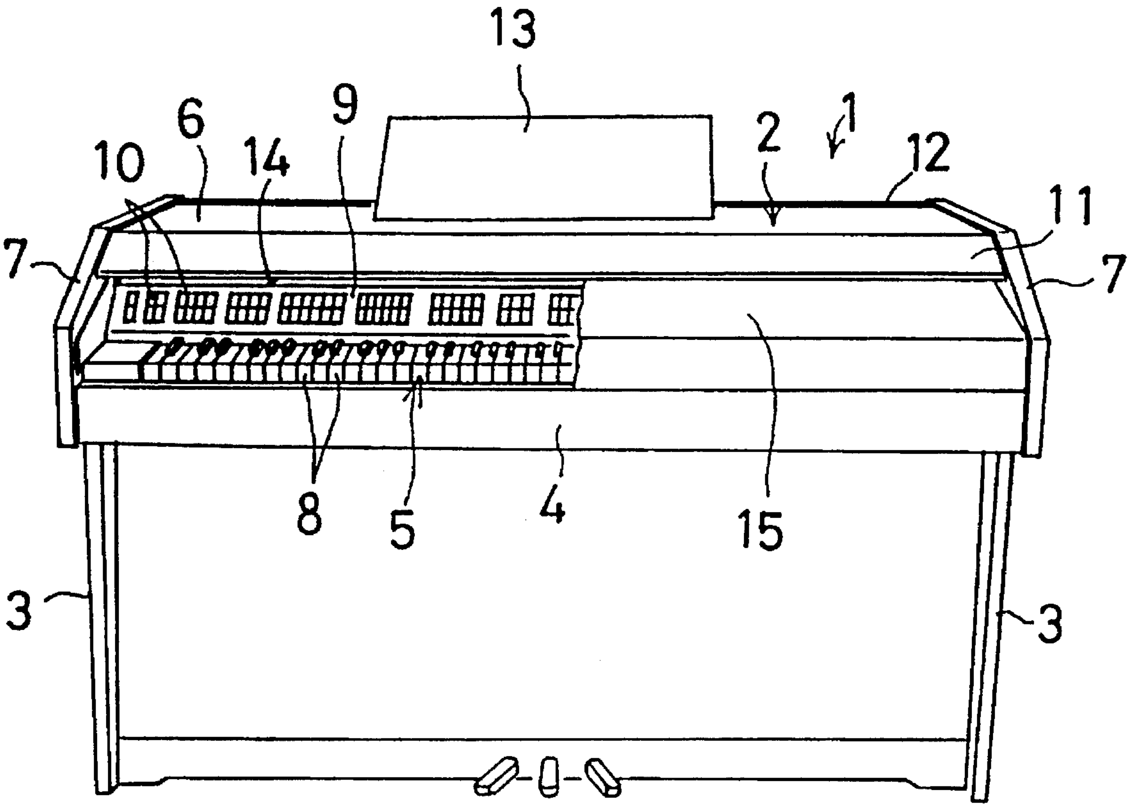
FIG. 1 is an exterior view of an electronic piano to which the present invention is applied.

FIG. 1 is an exterior view of an electronic piano 1 which comprises a main body 2 and two leg portions 3 and 3 of piano. The main body 2 has a keyboard section 5 and a device section 6 arranged before and behind on the bottom plate 4 attached to the leg portions 3 and 3 ("before" and "behind" used herein mean respectively "proximal" to and "distal" from a player) and also has a pair of arm members 7 and 7 arranged with sandwiching the keyboard section 5 and the device section 6 therebetween.

The keyboard section 5 has a keyboard 8 and a control panel 9 covering the rear portion of the keyboard 8 in which many kinds of control switches 10 are arranged. The device section 6 has a top plate 11 and a rear plate 12 and contains an acoustic device and the like in a space defined by the top, rear and bottom plates 11, 12 and 4. A music stand 13 is mounted on the top of the top plate 11. Formed between the upper surface and the front end of the top plate 11 is a slit 14 through which a slide lid 15 can be slid in and out from the inside of the device section 6. The slide lid 15 can slide before and behind directions along the two arm members 7 and 7 and can open and close the upper space of the keyboard section 5 to cover and protect the keyboard 8.

Figure 2:
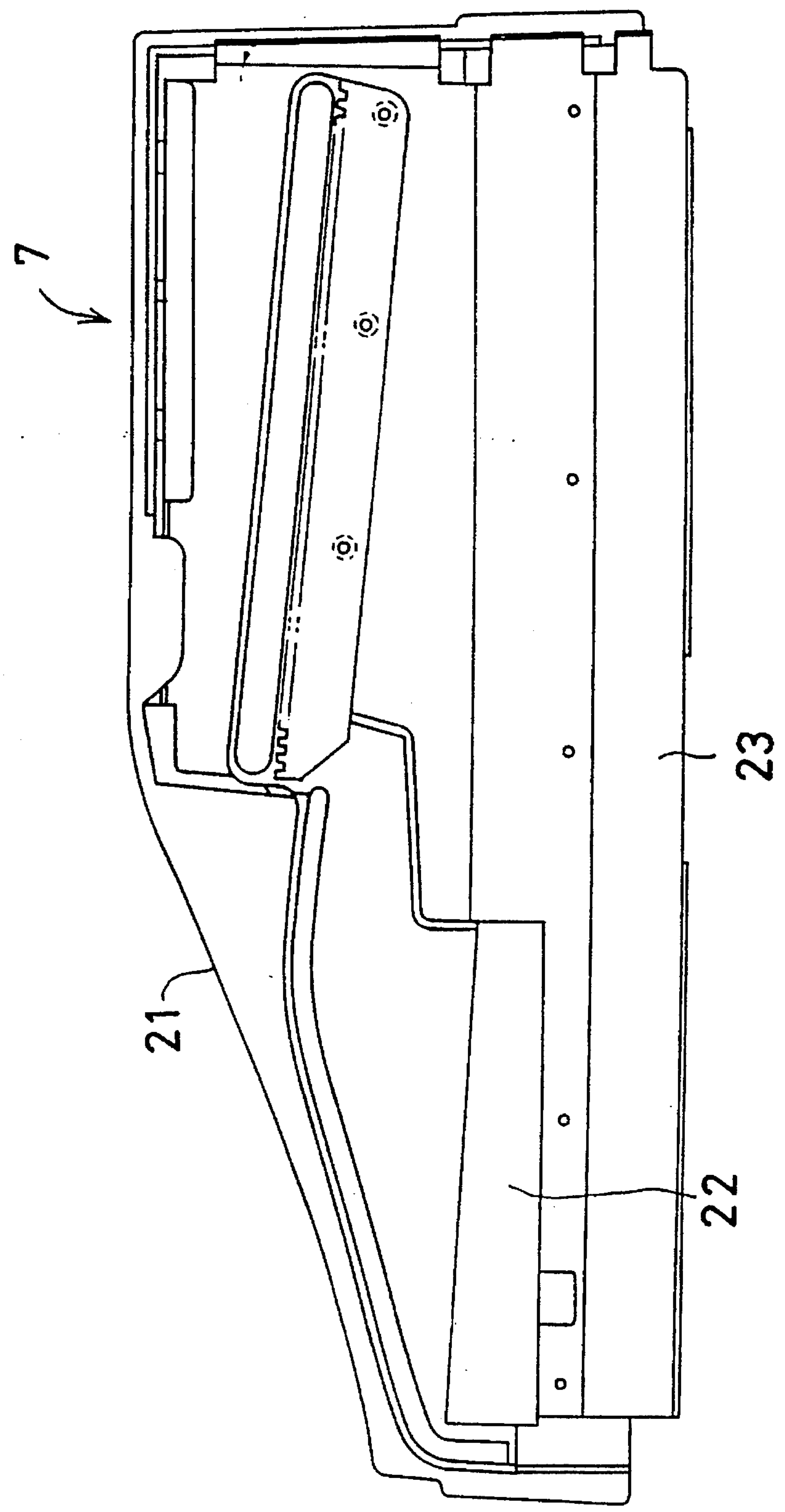
FIG. 2 is a side elevational view of an arm member of the electronic piano of FIG. 1 viewed from the inside thereof.
Figure 3:
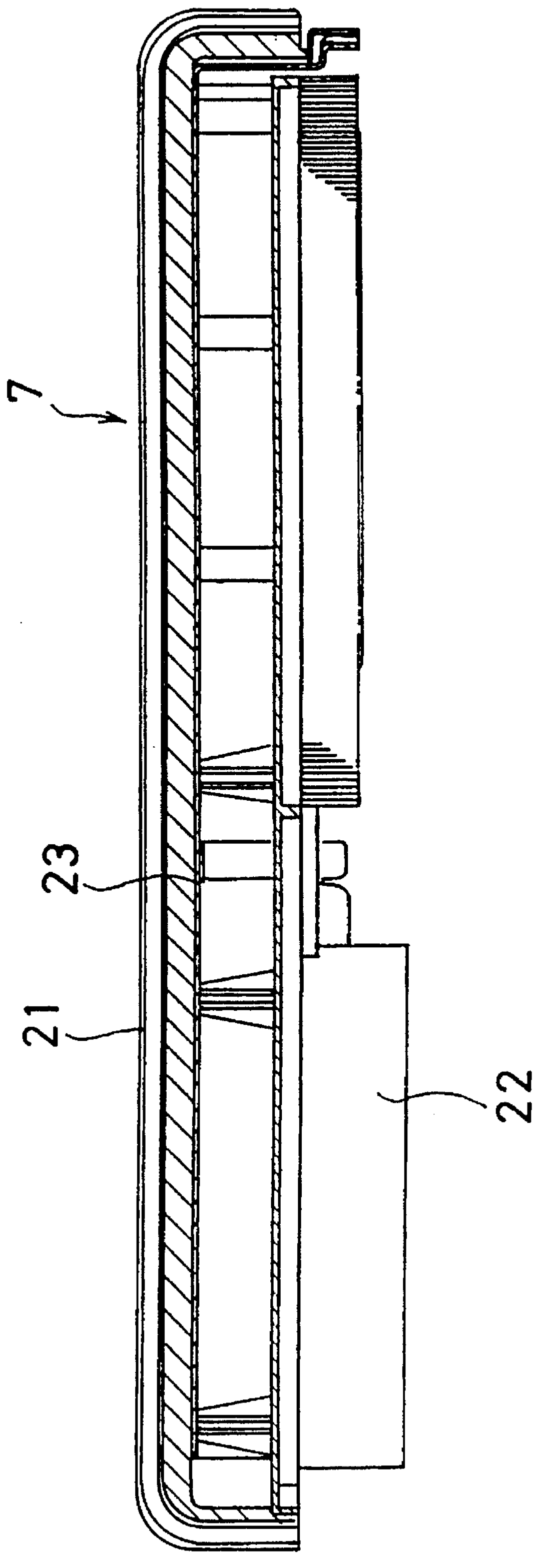
FIG. 3 is a horizontal cross-sectional view of the arm member of FIG. 2.
Figure 4:
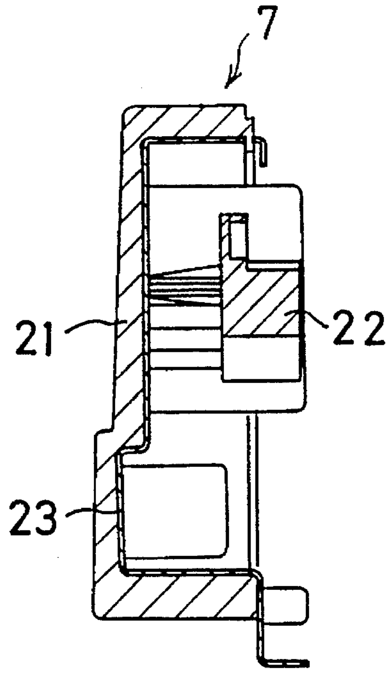
FIG. 4 is a vertical cross-sectional view of the arm member of FIG. 2.
Figure 5:
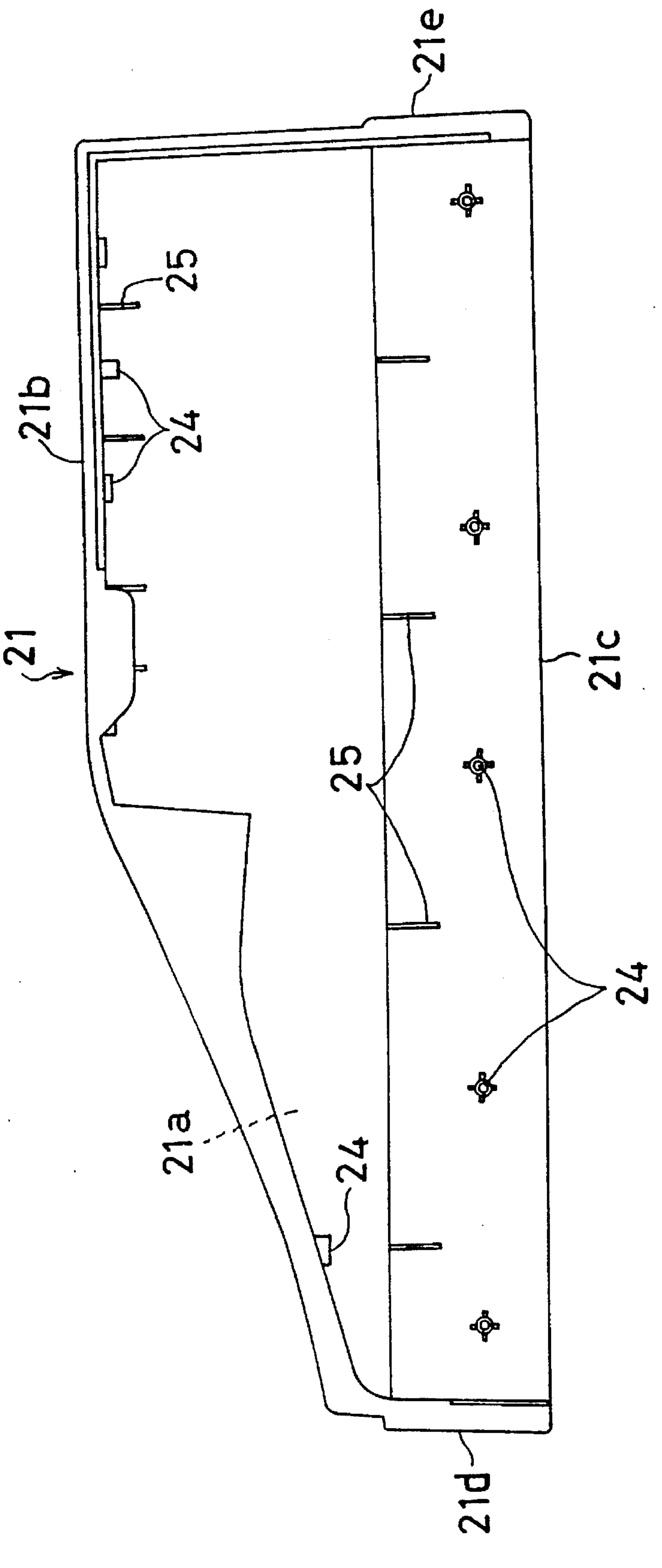
FIG. 5 is a side elevational view of an outer plate of arm member of FIG. 2.

Then the arm member 7 will be described with reference to FIGS. 2 through 4. FIGS. 2 through 4 are respectively side elevational view of one arm member viewed from the inside thereof, horizontal cross-sectional view and vertical cross-sectional view thereof. As shown in these drawings, the arm member 7 comprises an outer plate 21, an inner plate 22 and a reinforcing plate 23 of the arm member 7, and has a structure wherein the outer and inner plates 21 and 22 are mounted to the reinforcing plate 23. As shown in FIG. 5, the outer plate 21 comprises an outer face plate 21*a*, a top face plate 21*b*, a bottom face plate 21*c*, front face plate 21*d* and rear face plate 21*e*. These plates 21*a*~21*e* are integrally formed into a structure having a substantially C-shaped vertical cross-section and having a wholly voluminous and expanded lower exterior (FIG. 4). The outer plate 21 of arm member 7 is made of a decorative material such as plastics and is secured by screws from the inside to the reinforcing plate 23 arranged along the inner surface of the outer plate 21. For this purpose, a plurality of bosses 24 for screw and a plurality of reinforcing ribs 25 are formed on the inner surface of the outer plate 21.

Figure 6:
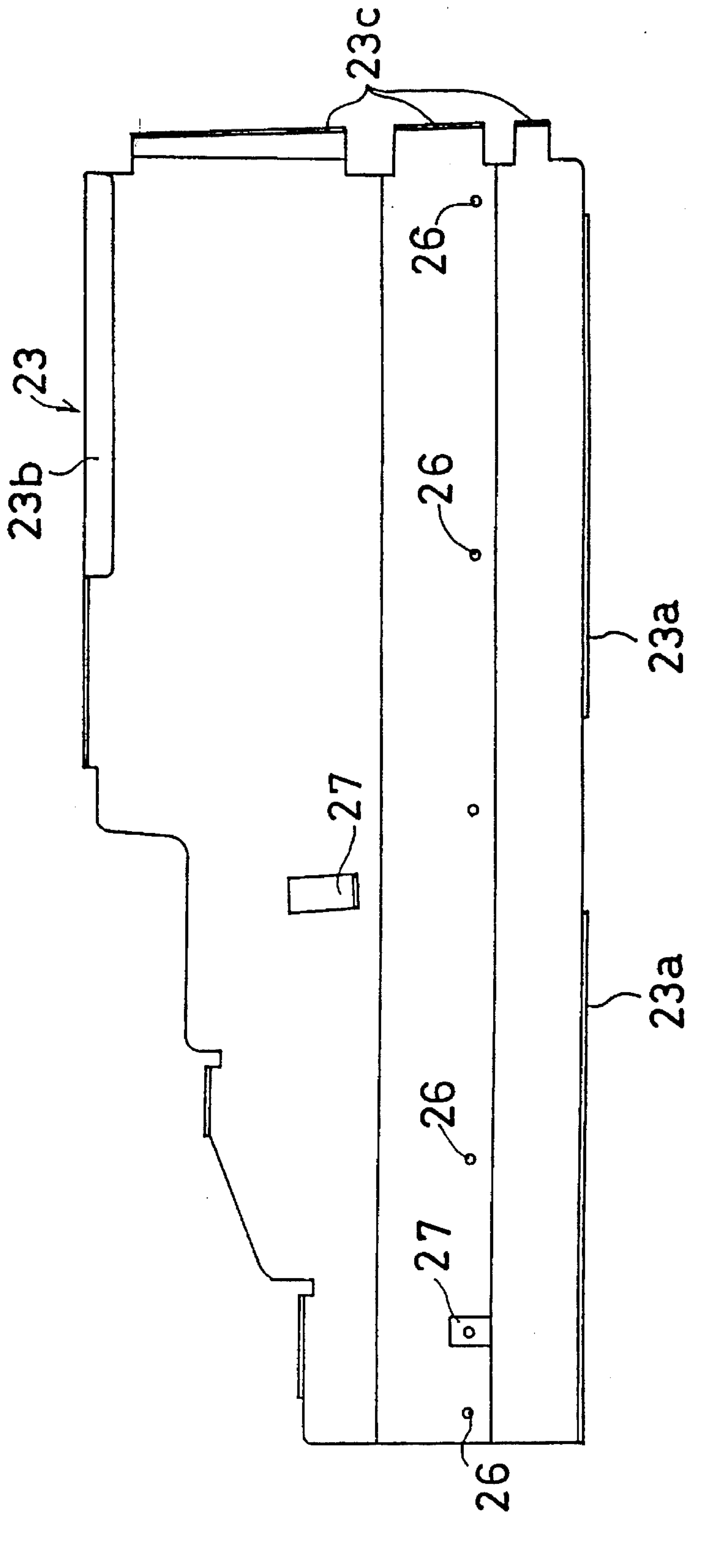
FIG. 6 is a side elevational view of a reinforcing plate of arm member of FIG. 2.
Figure 7:
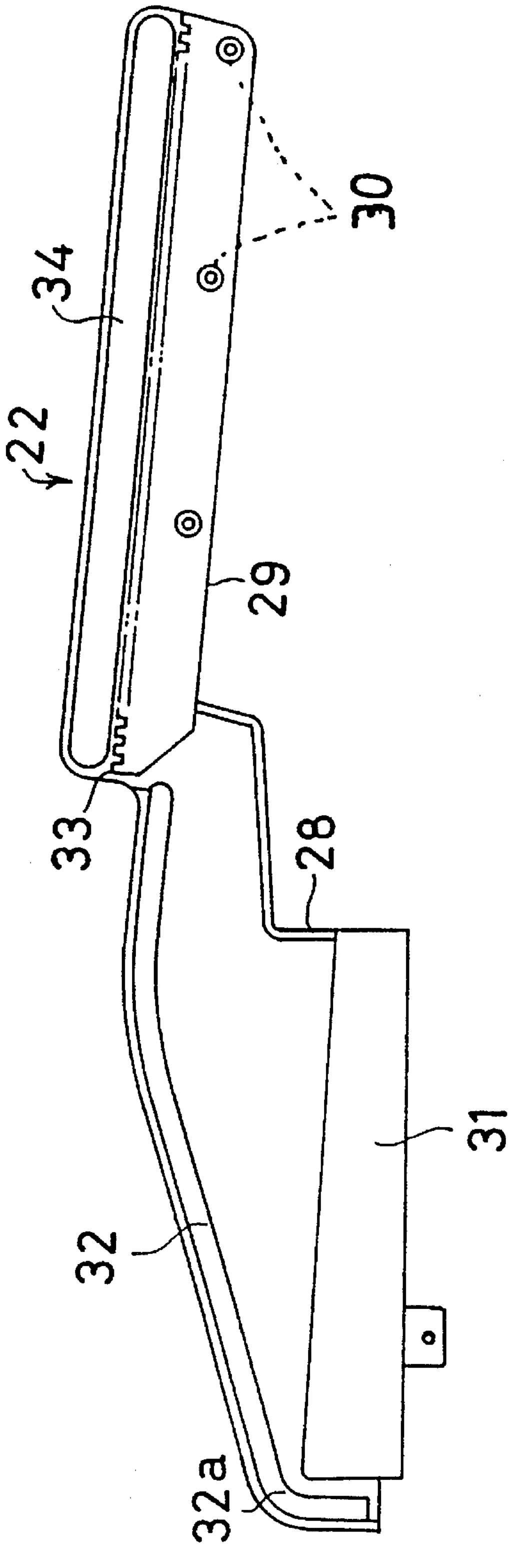
FIG. 7 is a side elevational view of an inner plate of arm member of FIG. 2.

As shown in FIG. 6, the reinforcing plate 23 of arm member is press-formed of a material having a superior strength such as steel and extends over a whole region of the inner surface of the outer plate 21. The reinforcing plate 23 is formed with a plurality of screw apertures 26 for securing the outer plate 21 and arms 27 for securing wooden clappers 31 hereinafter mentioned. Two bottom flanges 23*a* and 23*a* for securing the reinforcing plate 23 to the bottom plate 4, a top flange 23*b* for mounting the top plate 11 and three rear flanges 23*c*, 23*c* and 23*c* for mounting the rear plate 12 are formed in curved configurations respectively at the bottom end, the top end and the rear end of the reinforcing plate 23. As shown in FIG. 7, the inner plate 22 of arm member comprises a decorative portion 28 of front half and a lid guide portion 29 of rear half and is adapted to be secured to the reinforcing plate 23 by bosses 30 distributed in a whole region of the inner plate 22 (FIG. 2). The inner plate 22 is formed of a decorative material such as plastics, and the decorative portion 28 is exposed at the outside of the device section 6 and the lid guide portion 29 is concealed within the device section 6. The decorative portion 28 is formed, at the lower portion thereof, with the wooden clapper 31 along the keyboard 8 and is formed, at the upper portion thereof, a front guide groove 32. The front guide groove 32 is formed along the periphery of the decorative portion 28 from the front end portion to the rear end portion thereof to slidably guide the front portion of the slide lid 15. The front guide groove 32 extends from the bottom to the top at the front end portion of the decorative portion 28 and further extends rearwardly therefrom through a curved portion 32*a*. This causes the front portion of the slide lid 15 to be guided once upwardly and then the direction thereof to be slowly changed rearwardly. That is, the force applied by a player to the slide lid 15 can be utilized firstly upwardly and then rearwardly to smoothly open the slide lid 15.

The lid guide portion 29 is formed, at the lower half thereof, with a rack 33 and is formed, at the upper half thereof, a rear guide groove 34. Both the rack 33 and the rear guide groove 34 extend linearly from the front end to the rear end of the lid guide portion 29 so as to slidably guide the rear end of the slide lid 15. That is, the slide lid 15 can be guided by the front guide groove 32 and the rear guide groove 34 and slidably moved between a closed position in which it is forwardly pulled out for covering the keyboard 8 and an open position in which it is rearwardly pushed back into the device section 6.

Figure 9:
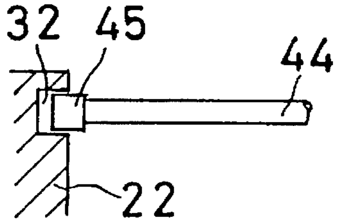
FIG. 9 is a side elevational view of a front portion of the slide lid of FIG. 8.
Figure 8:
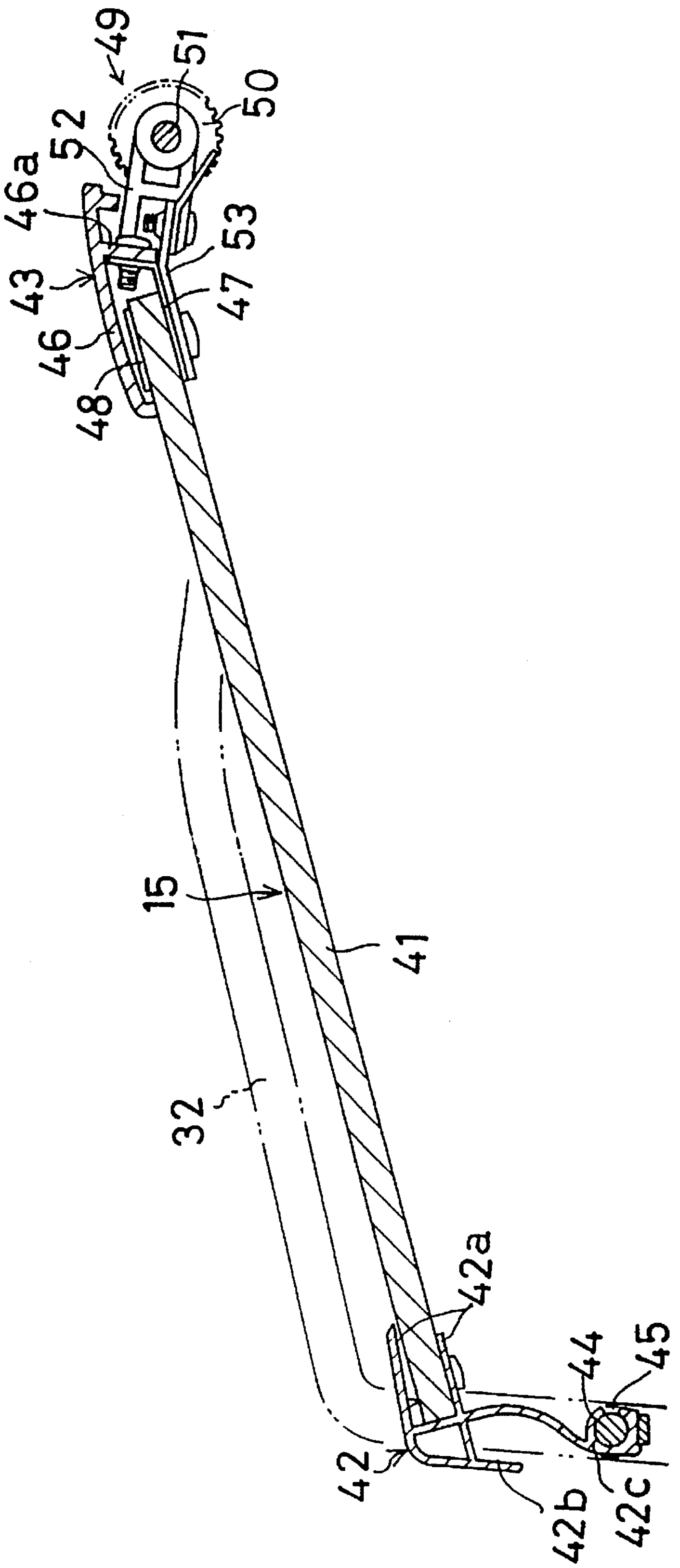
FIG. 8 is a cross-sectional view of a slide lid of the electronic piano of FIG. 1.

As shown in FIG. 8, the slide lid 15 comprises a lid body 41 and front and rear frame plates 42 and 43 mounted respectively at front and rear ends of the lid body 41. The lid body 41 is reinforced by the insertion of the front and rear frame plates 42 and 43 into the lid body 41. The front frame plate 42 is formed of decorative plastics, for example, formed by extrusion and has a securing portion 42*a* screwed to the lid body 41, a handle portion 42*b* of hooked configuration, and a bar holding portion 42*c* to which a front guide bar 44 is mounted. The outer end of the front guide bar 44 is slightly projected from the front frame plate 42 and has a plastic cap mounted thereon for forming a front guide projection 45 as shown in FIG. 9. That is, the front guide projection 45 is adapted to slide within the front guide groove 32 for guiding the sliding motion of the front portion of the slide lid 15.

The rear frame plate 43 comprises a decoration plate 46 of upper side and first and second securing plates 47 which are lid reinforcing plates for mounting the decoration plate 46 to the lid body 41. A slide mechanism 49 is mounted to the rear end of the rear frame plate 43. The decoration plate 46 is formed of decorative plastics, for example, formed by extrusion and has a somewhat upwardly convex configuration so as to close the slit 14 between the control panel 9 and the top plate 11 when the slide lid 15 is in its closed position. The decoration plate 46, at a rib 46*a* projected from the under surface thereof, is screwed to the first securing plate 47 with the front end of the decoration plate 46 contacted with the lid body 41 and is secured to the lid body 41 through the first securing plate 47. Thus any projection such as a securing screw is not exposed from the surface of the decoration plate 46. The first and second securing plate 47 and 48 are formed of a material superior in strength such as steel and are mounted on the lid body 41 with sandwiching it therebetween. In this case, although the second securing plate 48 is positioned on the external surface of the lid body 41, the decoration plate 46 covers the second securing plate 48 and prevents the plate 48 from being seen from the outside.

Figure 10:
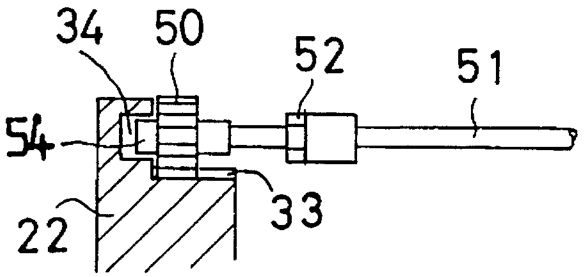
FIG. 10 is a side elevational view of a rear portion of the slide lid of FIG. 8.

The slide mechanism 49 comprises a pinion 50 mating with the rack 33, a rear guide bar 51 which is a shaft for supporting the pinion 50, a holder 52 for holding the rear guide bar 51, and a mounting plate 53 for mounting the holder 52 to the rear frame plate 43. The slide mechanism 49 is fastened to the lid body 41 via the mounting plate 53 together with the first securing plate 47. The outer end of the rear guide bar 51, as shown in FIG. 10, is somewhat projected from the pinion 50 to which a plastic cap is mounted, and forms a rear guide projection 54. That is, the rear guide projection 54 can slide within the rear guide groove 34 in the inner plate 22 of arm member and guide the sliding motion of the rear portion of the slide lid 15.

According to the slide lid 15 mentioned above, since the decoration plate 46 which can be seen from the outside is formed of a material superior in a decorative function as well as the first and second securing plates 47 and 48 which cannot be seen from the outside are formed of a material superior in strength, it is easily possible to provide the rear frame plate 43 with both decorative and reinforcing functions. It is also possible to reduce the cost of the rear frame plate 43 since the material and configuration of the decoration plate 46 and the first and second securing plates 47 and 48 can be selected from various wide ranges. In addition, the first and second securing plates 47 and 48 can be made thin using a steel sheet and the like and therefore can reduce the occupying space of the slide lid 15.

According to the open-close structure of the slide lid 15 mentioned above, the slide lid 15 is slidably opened and closed between the open and close positions with both the front and rear guide projections 45 and 54 slidably engaged respectively within the front and rear guide grooves 32 and 34 in the inner plates 22 of arm members. In this case, since the slide lid 15 is guided not only at the rear portion but also at the front portion thereof it is possible to very smoothly slide the slide lid 15 without paying attention to the magnitude and direction of the force applied thereto. In particular, when opening the slide lid 15, the force applied by a player to lift the slide lid 15 can be naturally converted to a force to push the lid 15 rearwardly. That is, the direction of the force to open the slide lid 15 can be naturally converted to a direction suitable to open the lid 15. This enables any person who does not know the open-close structure of the slide lid 15 to open and close it without a feeling of physical disorder.

Further according to the arm members 7 mentioned above, since the outer plate 21 and the inner plate 22 of arm member which can be seen from the outside are formed of a material taken serious view of decorative function and the reinforcing plate 23 which cannot be seen from the outside is formed of a material taken serious view of strength, it is possible to provide the arm members 7 with both the decorative and reinforcing functions. In addition, since the outer, inner and reinforcing plates 21, 22 and 23 of arm member are formed by separate members, it is possible to select the material from wide variations, to simplify the configuration of them, to reduce the whole cost and weight of the arm members 7, and to improve the space efficiency.

What is claimed is:

1. An apparatus for slidingly opening and closing a keyboard lid for covering a keyboard of a keyed instrument between an open position and a close position, said keyboard lid having a front end with a pair of opposite sides and a rear end with a pair of opposite sides, said apparatus comprising:

a pair of front guide projections projecting laterally from the opposite sides of the front end of the keyboard lid;

a pair of rear guide projections projecting laterally from the opposite sides of the rear end of the keyboard lid; and a pair of side plates arranged on opposite sides of the keyboard, each one of said pair of side plates having a front guide groove engaging with a respective one of said pair of front guide projections and a rear guide groove engaging with a respective one of said pair of rear guide projections so as to slidably guide the keyboard lid between said open position and close position.

2. An apparatus as set forth in claim 1, wherein each of said pair of side plates has a curved outline, and wherein said front guide groove extends rearwardly from the front end of a respective one of said pair of side plates along and complementing said curved outline thereof.

* * * * *